UNITED STATES PATENT OFFICE.

HANS FOERSTERLING, OF PERTH AMBOY, NEW JERSEY, ASSIGNOR TO THE ROESSLER & HASSLACHER CHEMICAL CO., OF NEW YORK, N. Y., A CORPORATION OF NEW YORK.

PROCESS OF PREPARING A PRECIOUS-METAL-DISSOLVING MEANS.

1,076,006.     Specification of Letters Patent.     Patented Oct. 14, 1913.

No Drawing. Original application filed September 21, 1909, Serial No. 518,735. Divided and this application filed December 7, 1910. Serial No. 596,138.

*To all whom it may concern:*

Be it known that I, HANS FOERSTERLING, a subject of the Emperor of Germany, residing at Perth Amboy, county of Middlesex, State of New Jersey, have invented a new and useful Process of Preparing a Precious-Metal-Dissolving Means, of which the following is a specification.

My invention relates to a process of preparing a precious metal dissolving means which will easily generate halogen cyanids in connection with an oxidizing agent, and is a division of my application Serial No. 518,735, filed September 21, 1909.

It has been found advantageous, in practising the well known cyanid process in the treatment of certain ores, to add some means of oxidation, as for instance air, barium peroxid, persulfates, ozone, etc. It has further been found that halogen cyanids give a very good and quick extraction of the precious metals from complex ores like tellurids. The so-called Diehl process, which makes use of bromo cyanid, is extensively practised in Australia with good results, but as bromo cyanid is extremely poisonous and very volatile it has heretofore been prepared only just before it is used and can be produced only by the exercise of the greatest skill and care.

The usual practice heretofore, in making bromo cyanid, has been to mix sulfuric acid in a tank with water and allow the solution to cool. Cyanid is then dissolved in another tank and the cyanid solution added to the cooled diluted sulfuric acid. At the same time a mixture of an alkali bromid and bromate is added under stirring. The reaction takes place according to the following equation:

It is obvious that the manufacture of bromo cyanid as heretofore practised for this purpose is not simple and that great care must be taken in order to obtain good results. If the mixture of the alkali bromid and bromate is not the correct one, bromin is wasted.

In the following I have described one means of practising my new method of preparing my new precious metal dissolving means: I melt an alkali halogen, for instance sodium bromid with an alkali cyanid, for instance sodium cyanid, in the proportion of one molecule of sodium bromid to one molecule of sodium cyanid and permit the same to solidify. I have discovered that no decomposition takes place during this process. This double salt of sodium bromid and sodium cyanid is used instead of the mixture heretofore used consisting of sulfuric acid, sodium bromid, sodium bromate and cyanid. In order to convert this double salt of sodium bromid and sodium cyanid into bromo cyanid I add an oxidizing agent, for instance an acid solution of hydrogen peroxid, the reaction taking place according to the following equation:

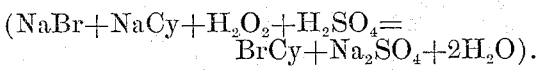

If an acid solution was not used sodium hydrate would be formed which would destroy the bromo cyanid according to the following equation:

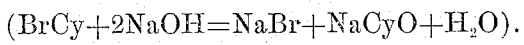

The rapidity of the formation of bromo cyanid according to the above formula depends somewhat on the concentration of the solution. I have found that if I pour a 25% volume hydrogen peroxid solution, to which the required amount of sulfuric acid has been added, over the double salt of sodium cyanid and sodium bromid the formation of bromo cyanid is so rapid that I have to cool the mixture. Bromin is seen to evolve and is at once taken up by the hydro cyanic acid. The bromo cyanid is boiling, but it can be easily condensed by proper cooling. If I dissolve 15 grams of sodium cyanid plus sodium bromid in 150 ccm. water and add to this solution 150 ccm. of water containing 3.4 grams hydrogen peroxid and 10 grams sulfuric acid the reaction takes place without necessitating cooling. If I use the same amounts of sodium cyanid plus sodium bromid and hydrogen peroxid plus sulfuric acid in 2000 ccm. of water apparently no reaction takes place, but by leaving the solution standing the bromo cyanid can be easily detected after a while by its characteristic smell. I have found that the formation of chlorin cyanid and iodin cyanid, according to the same formula, is more rapid than the formation of bromo cyanid.

Instead of using an acid solution of hydrogen peroxid, an alkali peroxid can be dissolved in an excess of an acid, or any other oxidizing agent can be used which will convert the cyanid double salt into halogen cyanid.

By the practice of my invention the mines receive the ready made correctly proportioned mixture of alkali halogen with the cyanid, all that is necessary being to dissolve a certain amount of the double salt and add an oxidizing agent.

In order to dissolve gold by the use of bromo cyanid, 3 parts of alkali cyanid should be added to 1 part of bromo cyanid, according to the following equation:

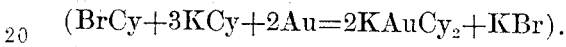
$$(BrCy + 3KCy + 2Au = 2KAuCy_2 + KBr).$$

I can add sufficient cyanid at the beginning to the alkali halogen so that I obtain a mixture equivalent to the sum of the two equations:

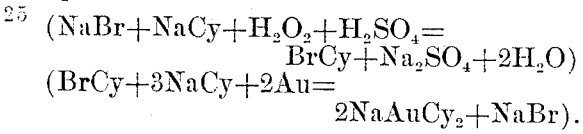
$$(NaBr + NaCy + H_2O_2 + H_2SO_4 =$$
$$BrCy + Na_2SO_4 + 2H_2O)$$
$$(BrCy + 3NaCy + 2Au =$$
$$2NaAuCy_2 + NaBr).$$

Furthermore, the largest part of the alkali halogen is not lost in practical mill work, and I therefore have to add only so much alkali halogen to the cyanid as is actually lost.

As an oxidizing agent I prefer to use an acid hydrogen peroxid solution, as it can be easily made by dissolving sodium peroxid in an excess of an acid. Such acid solutions of hydrogen peroxid, as is well known, are very stable.

It must be understood that I do not limit myself to the use of a mixture of sodium bromid and sodium cyanid and the use of hydrogen peroxid as an oxidizing agent. Instead of an alkali bromid another alkali halogen can be used which is able to form a halogen cyanid, as for instance alkali iodid. Instead of a mixture of an alkali halogen and alkali cyanid melted together and solidified I can use a double salt obtained by evaporating a solution of an alkali halogen and an alkali cyanid; instead of using an acid solution of hydrogen peroxid I can use any other oxidizing agent; instead of using sodium as the alkali I can use any other suitable alkali such as potassium.

What I claim and desire to secure by Letters Patent is:

1. A process of preparing a precious metal dissolving means consisting in forming a homogeneous solidified mixture of an alkali cyanid and an alkali halogen and dissolving the same in the presence of an oxidizing agent.

2. A process of preparing a precious metal dissolving means consisting in forming a homogeneous solidified mixture of sodium cyanid and sodium bromid and dissolving the same in the presence of an oxidizing agent.

3. A process of preparing a precious metal dissolving means consisting in forming a homogeneous solidified mixture of an alkali cyanid and an alkali halogen and dissolving the same in the presence of an acid solution of a suitable peroxid.

4. A process of preparing a precious metal dissolving means consisting in forming a homogeneous solidified mixture of sodium cyanid and sodium bromid and dissolving the same in the presence of an acid solution of a suitable peroxid.

5. A process of preparing a precious metal dissolving means consisting in forming a homogeneous solidified mixture of sodium cyanid and sodium bromid and dissolving the same in the presence of an acid solution of hydrogen peroxid.

In testimony whereof I have signed this specification in the presence of two subscribing witnesses.

HANS FOERSTERLING.

Witnesses:
 E. D. George, Jr.,
 Arnold Neunenberg.